United States Patent [19]

Molari

[11] 4,198,468

[45] *  Apr. 15, 1980

[54] IMPACT RESISTANT LAMINATE

[75] Inventor: Richard E. Molari, Pittsfield, Mass.

[73] Assignee: General Electric Company, Pittsfield, Mass.

[ * ] Notice: The portion of the term of this patent subsequent to May 31, 1994, has been disclaimed.

[21] Appl. No.: 952,678

[22] Filed: Oct. 19, 1978

[51] Int. Cl.² .......................... B32B 9/04; B32B 27/36
[52] U.S. Cl. ................................. 428/412; 428/447; 428/448; 428/911
[58] Field of Search .............. 428/412, 447, 448, 911

[56] References Cited

U.S. PATENT DOCUMENTS

| | | | |
|---|---|---|---|
| 3,189,662 | 6/1965 | Vaughn, Jr. | 260/46.5 R |
| 3,396,075 | 8/1968 | Morris | 428/426 |
| 3,520,768 | 7/1970 | Peilstocker et al. | 428/412 |
| 3,594,264 | 7/1971 | Urban | 428/412 X |
| 3,622,440 | 11/1971 | Snedeker | 156/329 X |
| 3,624,238 | 11/1971 | McKenzie | 428/412 |
| 3,657,057 | 4/1972 | Shorr | 156/99 X |
| 3,666,614 | 5/1972 | Snedeker et al. | 428/412 |
| 3,681,167 | 8/1972 | Moore | 428/412 X |
| 3,707,397 | 12/1972 | Gagnon | 428/412 |
| 3,764,457 | 10/1973 | Chang et al. | 428/412 |
| 3,810,815 | 5/1974 | Welhart et al. | 428/412 |
| 3,832,419 | 8/1974 | Merritt, Jr. | 260/824 R |
| 4,027,072 | 5/1977 | Molari, Jr. | 428/412 |

*Primary Examiner*—Lorraine T. Kendell
*Attorney, Agent, or Firm*—Myron B. Kapustij; William F. Mufatti

[57] ABSTRACT

Improved impact or shock resistant laminates are provided comprising a plurality of laminae including a back polycarbonate lamina of controlled thickness opposite the direction of impact or shock, a front polycarbonate lamina facing the direction of impact or shock, and at least one acrylic resin lamina intermediate said back and front polycarbonate laminae, said polycarbonate laminae having a relatively brittle overlayer or coating on the outer surfaces thereof opposite said intermediate acrylic based lamina.

6 Claims, No Drawings

IMPACT RESISTANT LAMINATE

This invention relates to improved impact resistant laminates. More particularly, it relates to such laminates having a plurality of layers or laminae including a back polycarbonate lamina of controlled thickness opposite the direction of impact or shock, a front polycarbonate lamina facing the direction of impact or shock, and at least one acrylic resin based lamina intermediate said front and back polycarbonate lamine, said polycarbonate layers having on the sides thereof opposite the intermediate acrylic based lamina relatively brittle coating. The laminates are particularly characterized by control of the thickness of the back polycarbonate lamina which reduces spalling or other failure of the polycarbonate surface when the laminates are subject to impact or shock, thereby improving the performance of the laminates.

BACKGROUND OF THE INVENTION

The use of so-called safety glazing or penetration resistant glazing for windows, windshields and the like utilizing polycarbonate resin layers as a structural component is well known. For example, glass polycarbonate resin laminates are described in U.S. Pat. No. 3,666,614, the glass and polycarbonate being cohered together using an ethylene-vinyl acetate copolymer. In U.S. Pat. No. 3,520,768, there are described laminates of relatively thick glass having a comparatively thin polycarbonate foil as the cohering material. It is also known to utilize certain polysiloxane-polycarbonate block copolymers described more particularly hereinafter as the adhesive layers. It is normal practice in constructing certain such laminates to utilize glass or relatively hard solid resinous materials as the impact or shock receiving layers while utilizing polycarbonate as the back or inner or downstream layer or that presented to the person or object being protected. In those cases where polycarbonate is used as a layer of a laminate, it is often, because of the relative softness of the polycarbonate, protected, especially on its exposed surface, with a mar- or scratch-resistant and transparency preserving layer usually less than 2 mils thick and, preferably, from about 0.05 to 2 mils thick. The minimum thickness is restricted only by current application technology and the desired durability of the mar-resistant coating. Maximum acceptable coating thickness is a function of the relative brittleness of the mar-resistant finish. In general, such mar-resistant layers, which are well known, can be metal oxides; modified melamines; ultraviolet hardenable organics such as acrylated monomers or mixtures of these monomers with acrylate-modified polymeric resins; inorganic glasses such as silica or alumina; polyurethanes; silicone resins with recurring organic groups such as polymethyl methacrylate; silica, such as colloidal silica, filled silicone resins; silicone resins derived from epoxy terminated silanes; polyamide ester resins; and, ion-beam deposited carbon, among others, are harder and relatively more brittle than the underlying polycarbonate layer which they protect. It has been found that in impact shock-resistant laminates utilizing such relatively brittle material cracks under impact causing the rear-most polycarbonate layer to spall, thereby causing damage to exposed objects behind the laminate. Such spalling occurs because of the so-called "notch sensitive" character of polycarbonates. Thus, if an overlying brittle layer is broken, the fracture lines propagate to the polycarbonate and act as "critical" notches causing the polycarbonate to fail in a brittle manner with little of the energy absorption typical of this normally impact-resistant material.

It will thus be seen that there is a need for providing impact shock resistant laminates using polycarbonate and overlying relatively more brittle material which are reduced in this so-called notch sensitivity, thus making them more useful from a practical point of view.

DESCRIPTION OF THE INVENTION

According to the present invention, there are provided improved shock and impact resistant laminates comprised of a plurality of lamina including at least one acrylic resin based inner shock resistant lamina, a front polycarbonte lamina facing the direction of impact or shock having a relatively brittle overlayer or coating on the outside surface, i.e., the surface opposite the acrylic based inner lamina, and a back polycarbonate lamina of controlled thickness opposite the direction of impact or shock having a relatively brittle overlayer or coating on the outside surface, i.e., the surface opposite the acrylic based inner lamina. The back polycarbonate lamina has a thickness restricted to less than about 220 mils and preferably from about 30 to about 150 mils. It has been found that in this thickness range, i.e., below about 220 mils, the notch sensitivity of the polycarbonate lamina coated with a relatively brittle mar-resistant coating is substantially reduced, thereby greatly improving the performance and practical utility of the laminates. The minimum thickness of the polycarbonate lamina is restricted only by current coating application technology and maintenance of good optics of the coated product. Thicknesses less than about 30 mils tend to be somewhat impractical. While the thickness of the front polycarbonate lamina is not critical, that is, the front polycarbonate lamina can be of a thickness greater than 220 mils, a preferred embodiment of the instant invention is a laminate wherein the front polycarbonate lamina is also of a controlled thickness, i.e, a thickness below 220 mils, preferably between 30 and 220 mils.

The acrylic resin based interlayer is of a thickness greater than the thickness of the polycarbonate lamina. The thickness of the acrylic resin interlayer depends upon the degree of shock or impact that it is desired for the laminates to withstand. The greater the shock or impact that the laminates are desired to successfully withstand, the greater the thickness of the acrylic resin interlayer. Thus, for example, in the case of laminates used as bullet resistant laminates if the laminate is required to withstand "Medium Power" bullets, e.g., 9 mm Luger, 0.38 and 0.38 super, the thickness of the acrylic resin interlayer is about 375 mils. If the laminates are to successfully withstand the impact of high caliber bullets, the thickness of the acrylic resin interlayer should be greater than 375 mils. Generally, the thickness of the acrylic resin interlayer ranges from about 250 mils to an upper thickness limit which is dependent on the degree of shock and impact resistance being desired. The upper thickness limit will generally be limited by practical considerations such as weight and bulkiness and, therefore, generally is about 4,000 mils, with 3,000 mils being preferred, and 1,000 mils being more preferred.

At the higher thicknesses, two or more plys of the acrylic resin may be used for the intermediate construction. If two or more acrylic lamina are used, they are bonded together by the hereinbelow described adhesive.

Any polycarbonate resin can be used as laminae for both the front and back polycarbonate lamina including but not limited to those described in U.S. Pat. Nos. 3,161,615; 3,220,973; 3,312,659; 3,312,660; 3,313,777; 3,666,614, among others, all of which are included herein by reference. Preferred polycarbonate resins are the aromatic polycarbonate resins.

The term "acrylic resin" as it appears herein is meant to embrace within its scope those polymers or resins resulting from the polymerization of one or more acrylates such as, for example, methyl acrylate, ethyl acrylate, butyl acrylate, 2-ethylhexyl acrylate, etc., as well as the methacrylates such as, for instance, methyl methacrylate, ethyl methacrylate, butyl methacrylate, hexyl methacrylate, etc. Copolymers of the above acrylate and methacrylic monomers are also included within the term acrylic resin as it appears herein. The polymerization of the monomeric acrylates and methacrylates to provide the polyacrylate resins useful in the practice of the invention may be accomplished by any of the well known polymerization techniques. A preferred acrylic resin is poly(methylmethacrylate).

Where desirable, adhesion promoting primers can be used to promote adhesion, such material being well known and including, among others, vinyl alkoxy silanes, aminoalkylalkoxy silanes, alkoxy silanes, silyl peroxides and amino-alkoxy silanes, such materials being described in the above U.S. Pat. No. 3,666,614 and elsewhere. A present advantage is that primers are usually not necessary in connection with any polycarbonate or acrylic resin used although they can be used where indicated.

Any conventional adhesives may be used between the laminae including polyvinylbutyrals, ethylene terpolymers, epoxies, polyurethanes, silicones, acrylics, and ethylene acrylic acids, among others. The adhesive interlayer in contact with the polycarbonate laminae must provide not only good adhesion but also must be chemically compatible with the sensitive polycarbonate. The preferred interlayer for contact with the polycarbonate laminae is a polysiloxane-polycarbonate block copolymer.

The polysiloxane-polycarbonate block copolymers can be expressed by the average formula

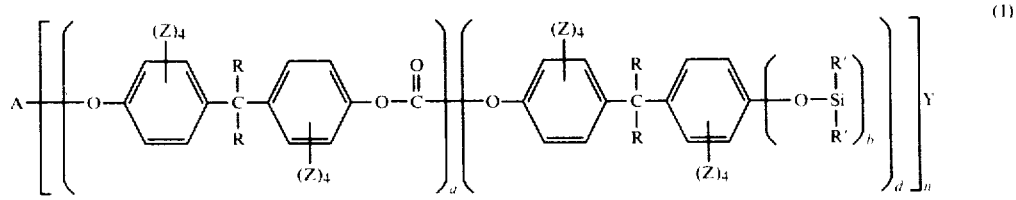

where n is at least 1, and preferably n is an integer equal to from 1 to about 1000, inclusive, a is equal to from 1 to about 200, inclusive, b is equal to from about 5 to about 200, inclusive, and preferably b has an average value from about 15 to about 90, inclusive, while the ratio of a to b can vary from about 0.05 to about 3, inclusive, and when b has an average value of from about 15 to about 90, inclusive, the ratio of a to b is preferably from about 0.067 to about 0.45, inclusive, and d is 1 or more, Y is

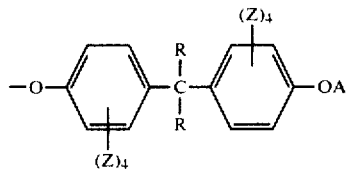

A is a member selected from the class of hydrogen and $$-\overset{O}{\underset{\|}{C}}-OR''$$

R is a member selected from the class of hydrogen, monovalent hydrocarbon radicals and halogenated monovalent hydrocarbon radicals, R' is a member selected from the class of monovalent hydrocarbon radicals, halogenated monovalent hydrocarbon radicals and cyanoalkyl radicals, R'' is a member selected from the class consisting of monovalent hydrocarbon radicals and halogenated hydrocarbon radicals, and Z is a member selected from the class of hydrogen, lower alkyl radicals and halogen radicals and mixtures thereof.

Included within the radicals represented by R of Formula 1 are aryl radicals and halogenated aryl radicals such as phenyl, chlorophenyl, xylyl, tolyl, etc.; aralkyl radicals such as phenylethyl, benzyl, etc.; aliphatic, haloaliphatic and cycloaliphatic radicals such as alkyl, alkenyl, cycloalkyl, haloalkyl including methyl, ethyl, propyl, chlorobutyl, cyclohexyl, etc.; R can be all the same radical or any two or more of the aforementioned radicals, while R is preferably methyl, R' includes all radicals included by R above except hydrogen, where R' can also be all the same radical or any two or more of the aforementioned R radicals except hydrogen, and R' is preferably methyl. R' also includes, in addition to all the radicals included by R, except hydrogen, cyanoalkyl radicals such as cyanoethyl, cyanobutyl, etc. radicals. Radicals that are included within the definition of Z of Formula 1 are hydrogen, methyl, ethyl, propyl, chloro, bromo, iodo, etc. and combinations thereof, and Z is preferably hydrogen.

The hydrolytically stable copolymers of the present invention can be further described as comprising recurring copolymeric units of a polydiorganosiloxane joined by substituted aryloxy-silicon linkages to a polyester of dihydric phenol and a precursor of carbonate acid, where each of said recurring copolymeric units comprises by average weight from about 10% to about 75% of said polydiorganosiloxane, and preferably from about 40 to 70% by weight.

The copolymers of Formula 1 can be produced by reacting at temperatures in the range of 0° C. to 100° C., preferably, 20° C. to 50° C., and in the presence of an acid acceptor, a mixture of a halogen chain-stopped polydiorganosiloxane having the formula

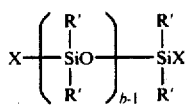 (2)

and a dihydric phenol having the formula

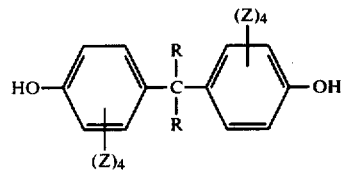 (3)

and thereafter phogenating said reaction product until the resulting copolymer achieves a maximum intrinsic viscosity, where R, R', Z and b are as defined above, and X is a halogen radical, preferably chloro.

The halogen chain-stopped polydiorganosiloxanes of Formula 2 can be made by conventional procedures such as by the controlled hydrolysis of a diorganodihalosilane, for example, dimethyldichlorosilane as taught in Patnode U.S. Pat. No. 2,381,366 and Hyde U.S. Pat. Nos. 2,629,726 and 2,902,507.

Another procedure that can be employed involves equilibrating a mixture of a diorganodichlorosilane and a cyclic polydiorganosiloxane in the presence of a metal catalyst such as ferric chloride as shown in Sauer U.S. Pat. No. 2,421,653. Although the various procedures utilized in forming the halogen chain-stopped polysiloxane are not critical, generally it has been found desirable to maintain the halogen content of the resulting halogen chain-stopped polysiloxane in the range of about 0.4 to about 35% by weight, and preferably from about 1 to about 10% by weight of said halogen chain-stopped polysiloxane. The halogen chain-stopped polysiloxane is preferably in the form of a chlorinated polydimethylsiloxane.

Dihydric phenols that are included in Formula 3 are, for example, 2,2-bis(4-hydroxyphenyl)-propane (bisphenol-A); 2,4'-dihydroxydiphenylmethane; bis-(2-hydroxyphenyl)-methane; bis-(4-hydroxyphenyl)-methane; 1,1-bis-(4-hydroxyphenyl)-ethane; 1,2-bis-(4-hydroxyphenyl)ethane; 1,1-bis-(4-hydroxy-2-chlorophenyl)-ethane; 1,1-bis-(2,5-dimethyl-4-hydroxyphenyl)-ethane; 1,3-bis-(3-methyl-4-hydroxyphenyl)-propane; 2,2-bis-(3-isopropyl-4-hydroxyphenyl)-propane, etc. Mixtures can also be used. Others will occur to those skilled in the art.

The copolymers of the present invention essentially comprise recurring units consisting of a polydiorganosiloxane interconnected by substituted aryloxy-silicon linkages to a polyester of carbonic acid precursor and a dihydric phenol.

Materials of the above nature are also described in U.S. Pat. No. 3,189,662 included herein by reference and can be used either alone as such or in conjunction with well known modifiers to provide particular described characteristics.

Illustrative of the above block copolymers is General Electric LR-3320. This material has a specific gravity of 1.12, a tensile strength of 2500 to 3900 psi, an elongation of 230 to 430, a tear strength (Die C) of 400 lbs./in., and a brittleness temperature below −76° F. and a heat deflection temperature (10 mils under 66 psi Load) of 160° F.

Another such block copolymer, specifically General Electric LR-5530, has a specific gravity of 1.07, a tensile strength of 2200 to 2500 psi, an elongation of 500–700 T, a tear (Die C) of 200 lbs./in., and a brittleness temperature below −76° F. and a heat deflection temperature (66 psi) of 130° F.

Where a polycarbonate layer without further description or designation is mentioned herein, it is the polycarbonate of bisphenol-A or 2,2-bis(4-hydroxyphenol) propane.

DESCRIPTION OF THE PREFERRED EMBODIMENT

In order to more fully and clearly illlustrate the present invention, the following specific examples are presented. It is intended that the examples be considered as illustrative rather than limiting the invention disclosed and claimed herein. In the examples, all parts and percentages are on a weight basis unless otherwise specified.

EXAMPLE 1

This example illustrates a prior art laminate over which the present invention represents an improvement. There were laminated in an autoclave using a vacuum bag with a temperature of 250° F., a pressure of 240 to 250 psi and a hold time of 45 minutes a laminate consisting of strengthened primed glass 125 mils thick bonded by 60 mils of LR-5530 polysiloxane-polycarbonate block copolymer to a 250 mil sheet of polycarbonate bonded in turn through 30 mils of LR-3320 polysiloxane-polycarbonate block copolymer to a 375 mil thick layer of polycarbonate, the latter having a relatively more brittle mar-resistant coating on its back, exposed or inboard laminate surface. When a "Medium Power" bullet was fired at the glass surface in accordance with Underwriters Laboratory Standard for Bullet-Resisting Equipment, specifically UL 752, dated Feb. 23, 1973, at a temperature of 55° F., the exposed surface of the 375 mil polycarbonate ply or layer spalled in a brittle manner, although there was no bullet penetration, damaging cardboard indicators placed approximately about 18 inches behind the test laminate. This example illustrates the so-called notch sensitivity of the relatively thick polycarbonate layer when it is subjected to impact shock. Reference to various powered ammunition and other test materials are as specified in the above Standard.

EXAMPLE 2

This example illustrates another typical prior art impact shock-resistant laminate utilizing polycarbonate layers. There was prepared in an air autoclave using a vacuum bag at a temperature of 257° F., a pressure of 240 to 250 psi and a hold time of 30 minutes, a laminate having a front or impact shock receiving ply of 250 mils of polycarbonate with a relatively more brittle mar-resistant outer surface. This polycarbonate layer was bonded using a 20–25 mil thick layer of LR-3320 block copolymer to a 500 mil thick layer of polycarbonate bonded in turn by a similar thickness of LR-3320 block copolymer to a back ply of polycarbonate 250 mils thick, the latter ply having a relatively more brittle mar-resistant coating on its outer or downstream surface. The total thickness of this laminate was approximately 1 3/64" with a total polycarbonate thickness of 1". This laminate was tested in accordance with the above UL 752 Standard after the front outer surface was exposed to a temperature of −25° F. for a minimum of three hours, the inboard surface or back ply being exposed to ambient room temperature. When a "Medium Power" bullet was fired at the front ply, while there was no bullet penetration, a brittle punch-out type spall from the back or inboard polycarbonate surface caused damage to a cardboard indicator placed about 18 inches behind the laminate.

EXAMPLE 3

A laminate was prepared using a single intermediate polymethyl methacrylate ply 375 mils thick, a back ply of 125 mils of polycarbonate with a mar-resistant coating on its outer surface bonded by 34 mils of LR-3320 copolymer to the polymethyl methacrylate, and a front ply of 125 mils of polycarbonate with a mar-resistant coating on its outer surface bonded by 34 mils of LR-3320 copolymer to the polymethyl methacrylate. The laminate was prepared in an air autoclave using a vacuum bag at a temperature of 257° F., a pressure of 100 to 110 psi and a hold time of 30 minutes. The resulting laminate was resistant, at room temperature, to 0.38 super and 0.357 magnum slugs fired from a distance of 15 feet into the front polycarbonate face of the laminate. There was no spall from the mar-resistant 125 mil polycarbonate back ply.

There are provided, then, by the present invention improved impact shock-resistant laminates which overcome any notch sensitivity tendency of polycarbonate layers when overlaid with relatively more brittle material on the side opposite the impact receiving direction. The invention further makes possible and practical laminates of the type described which are not only improved in impact resistance but are resistant to marring and scratching and similar abuse which detracts from clarity or transparency when such laminates are used as windshields, windows, view ports, glazing and the like. Heating elements or detection means such as wires, films and the like well known to those skilled in the art can also be incorporated in the present structures.

What is claimed is:

1. Impact or shock resistant laminate having improved spall resistance consisting essentially of a plurality of laminae including a back polycarbonate lamina having a controlled thickness of from about 30 mils to about 220 mils opposite the direction of impact or shock, said back polycarbonate lamina having a mar-resistant coating on the exposed surface thereof opposite the direction of impact, a front polycarbonate lamina facing the direction of impact or shock having a mar-resistant coating on the exposed surface thereof facing the direction of impact, and at least one acrylic resin lamina disposed intermediate said back and front polycarbonate laminae, the back and front polycarbonate laminae being bonded to said acrylic resin lamina by a compatible adhesive.

2. The laminate according to claim 1 wherein said front polycarbonate lamina has a thickness from about 30 mils to about 220 mils.

3. The laminate according to claim 1 wherein said mar resistant coating is from about 0.05 mils to about 2 mils thick.

4. The laminate according to claim 1 wherein said mar resistant coating is harder and more brittle than the underlying polycarbonate.

5. The laminate according to claim 1 wherein said adhesive is comprised of a block polysiloxane-polycarbonate copolymer prepared by reacting (A) a halogen chain-stopped polydiorganosiloxane composed of from about 5 to 200 chemically combined diorganosiloxy units consisting essentially of dialkylsiloxy units which are connected to each other by silicon-oxygen-silicon linkages wherein each of the silicon atoms has two organo radicals attached through a carbon-silicon bond, and (B) a dihydric phenol having the formula

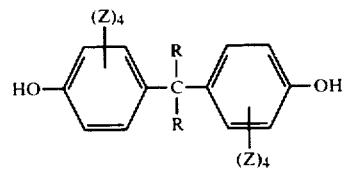

where Z is a member selected from the class consisting of hydrogen, lower alkyl radicals and halogen radicals and combinations thereof, and R is a member selected from the class consisting of hydrogen, hydrocarbon and halogenated hydrocarbon radicals, and phosgenating the purified reaction product.

6. The laminate according to claim 1 wherein one acrylic resin lamina is disposed between said back and front polycarbonate laminae.